June 23, 1959
E. B. CLARK
2,891,755
MOUNTING EAR IN SLOTTED OPENING
Filed Oct. 3, 1955
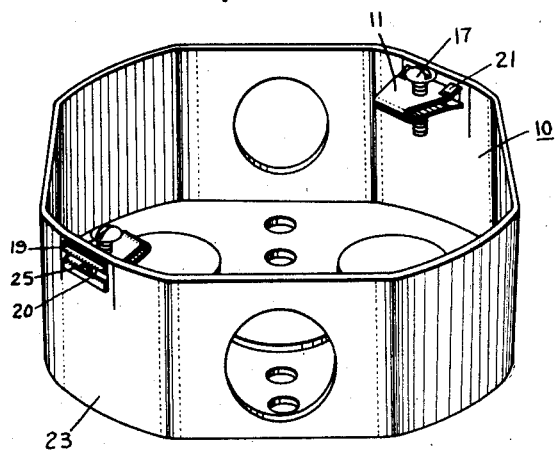
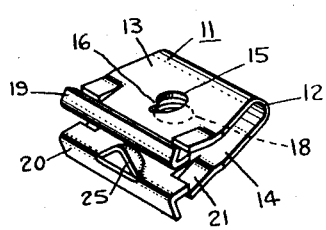
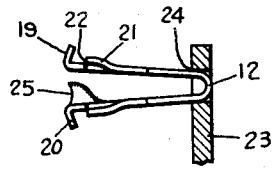
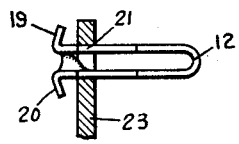
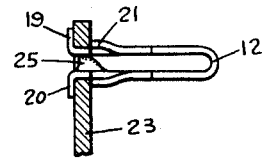
Inventor:
Edward B. Clark
by Allard A. Braddock
His Attorney

United States Patent Office 2,891,755
Patented June 23, 1959

2,891,755

MOUNTING EAR IN SLOTTED OPENING

Edward B. Clark, Milford, Conn., assignor to General Electric Company, a corporation of New York Application October 3, 1955, Serial No. 538,069

2 Claims. (Cl. 248—220.5)

This invention relates to a spring type mounting ear that is to be secured in a slotted opening in a thin wall member.

While this invention is described with relation to an electrical outlet box, it should be appreciated at the outset that this invention is of general utility wherever a mounting ear for receiving a screw fastener is to be supported from a thin wall member. In the past, electrical outlet boxes have been made with a pair of opposite mounting ears that are made integral with the outer edge of the box by trimming the entire edge so that only the small mounting ears remain. Then the ears were bent down into a single horizontal plane either inwardly or outwardly of the box, and later tapped so that a wiring device such as a switch or convenience outlet could be fastened in the box by screws threaded into the mounting ears.

My invention has resulted from an attempt to lower the cost of manufacturing such boxes by using a separate spring clip type of mounting ear that may be assembled on the walls of the box and yet pass the rigid weight supporting standards established by the Underwriters' Laboratories, Inc.

One embodiment of the present invention, as illustrated on the accompanying drawing, comprises a one-piece U-shaped strip of sheet metal where one of the arms is provided with a partial helical thread for engaging a screw fastener while the other arm has an enlarged aligned opening through which the screw may extend. The present invention is particularly concerned with means for solidly supporting the mounting ear in a slotted opening of narrow rectangular shape. The free end of each arm is bent outwardly to form a flange which in its unstressed condition is inclined from the perpendicular slightly toward the opposite end of the ear. Each arm has a pair of outwardly formed lugs or lanced members, the free ends of which are spaced from the adjacent flange by a distance substantially equal to the thickness of the wall member on which the ear is to be mounted. An inner embossment is likewise formed on one of the arms to limit the movement of the arms toward each other.

When such a mounting ear is to be assembled in the rectangular slot, the folded end of the ear is made to enter the slot first and pressure is exerted against the opposite end of the ear to force it as far as possible through the slot. The arms of the ear will compress slightly due to the small size of the slot until one arm engages the inner embossment of the other. As the spring ear continues to move through the slot, the outwardly formed lugs of the arms will engage the opposite sides of the slots and be deflected thereby back into their related arms. Toward the end of this operation, a sharp blow is delivered against the rear of the ear to bend the flanges into a single plane that lies perpendicular with the main portion of the ear. When this is accomplished, the lugs will again spring outwardly and in so doing will constitute locking members with each of the opposite edges of the slotted opening being clamped between the combination of a flange and a pair of lugs. Exhaustive tests have been made of this construction and it has proved to be as satisfactory in supporting box covers, wiring devices and ceiling fixtures such as lamp-holders and the like as an integral mounting ear yet at a much reduced cost in material and labor.

Accordingly, the principal object of this invention is to provide novel means for supporting a separable mounting ear in a slotted opening of a thin wall member.

A further object of this invention is to provide a spring type mounting ear of U-shaped sheet metal construction where the opposite arms of the member are held apart in the slotted opening by an inner embossment on one of the arms.

A further object of this invention is to provide a mounting ear of a U-shaped strip of sheet metal which is to be assembled in a slotted opening in a thin wall member where the free end of each arm is bent outwardly and inclined slightly toward the opposite end of the ear which serves to increase the clamping force of the ear in the opening.

My invention will be better understood from the following description taken in connection with the accompanying drawing and its scope will be pointed out in the appended claims.

Figure 1 is a perspective view of an electrical outlet box having assembled thereon a pair of spring type mounting ears according to my invention.

Figure 2 is an isometric view showing the details of a spring type mounting ear embodying my invention.

Figures 3–5 are views showing different steps in the assembly operation of supporting the mounting ear in the slotted opening.

Figure 3 is a view showing the folded end of the ear inserted in the opening.

Figure 4 is a view similar to that of Figure 3 after the two arms of the U-shaped member are pressed together with the outwardly formed lugs being deflected back into the plane of their respective arms from which they were struck.

Figure 5 is a view similar to that of Figures 3 and 4 with the spring type ear in its fully assembled position.

Referring in detail to the drawing and in particular to the perspective view of a standard outlet box of Figure 1 with the mounting ears of my invention assembled therewith, 10 represents a standard outlet box of drawn construction which is adapted to be joined by the ends of rigid conduit or electrical metallic tubing through which wires may be carried. The electrician will connect these wires to a wiring device such as a switch, outlet or junction (not shown) that is supported from the novel mounting ears 11 of the present invention. An electrical box has been used to show one application of the mounting ear of this invention, although it will be immediately apparent that it is of general utility wherever a separate projection is to be attached to a thin wall member.

Looking at Figures 2–5, it will be seen that the ear 11 is made of thin sheet metal material that is folded back on itself into a generally U-shape with a rounded end 12 and a pair of arms 13 and 14. The first arm 13 has an opening 15 with a small notch 16 in the edge so that the opening may be pressed out in the form of a helix and function as a thread for engaging a screw fastener such as element 17 of Figure 1. The other arm 14 has a larger opening 18 in alignment with the screw thread opening 15 merely for the purpose of allowing the screw 17 to extend therethrough. For purposes of illustration I have shown a formed helix thread in the mounting ear similar to that shown in the Place Patent No. 2,169,057, although equivalent thread means such as disclosed in the Tinnerman Patent No. 2,062,685 may be substituted therefor to obtain comparable results. As best shown in Figures 2–4, the free end of each arm 13 and 14 is bent into an outwardly extending flange 19 and 20 respectively which is inclined slightly from the perpendicular toward the rounded end 12 of the ear for reasons which will be better understood hereinafter.

A lug 21 is struck out of the side edges of both arms 13 and 14 with the free ends 22 thereof being generally parallel to the adjacent flange and spaced therefrom a distance which is substantially equal to the thickness of the wall such as side wall 23 of the box 10 on which the ear is to be mounted. The slotted opening 24 in the wall of the box is rectangular in shape and is so dimensioned with respect to the size and shape of the mounting ear 11 that there will be a tight fitting connection between the elements. The last remaining detail in this construction and one of primary importance is an inner embossment 25 on the surface of the arm 14 having its maximum elevation at a point which will lie within the slotted opening when the mounting ear is fully assembled on the wall, as is seen in Figure 5.

The assembly of this mounting ear 11 in the slotted opening 24 is quite simple and attention is here directed to Figures 3–5 showing the three steps for accomplishing this result. First, the rounded end 12 of the ear is directed into the slot and pressure is applied to the flanged end of the ear to force it through the slot and compress the arms 13 and 14 until the embossment 25 engages the arm 13. For all practical purposes the arms 13 and 14 do not bend any further so that as the ear continues to move through the slot, the lugs 21 will be deflected back into the plane of their respective arms, as is clearly shown in Figure 4. The ear progresses through the slot and a sharp blow must be delivered to the flanges as the final step so that they will spring back to lie in a single plane that is perpendicular to the main portion of the ear, as seen in Figure 5. When this is accomplished, the lugs 21 will no longer be confined within the slot and they will naturally spring back to their original unstressed positions of Figure 3 to lock the ear in the slot. It is this additional force against the flanges which allows the ear to reach its final position and free the lugs so that they may spring outwardly and against the edge of the slotted opening. The inherent spring action in the flanges 19 and 20 tends to pull the ear backward slightly causing a clamping action of the slot edge between the lugs and the flanges. When the mounting ear is made correctly and assembled in the proper size opening, no relative movement can be detected between the ear and the box when a normal force is exerted against the ear.

Modifications of this invention will occur to those skilled in this art and it is to be understood, therefore, that this invention is not limited to the particular embodiment disclosed but that it is intended to cover all modifications which are within the true spirit and scope of this invention.

What I claim as new and desire to secure by Letters Patent of the United States is:

1. A spring type mounting ear rigidly secured in a narrow slotted opening in a thin wall member, the mounting ear comprising a one-piece generally U-shaped strip of sheet metal, the free end of each arm being an outwardly turned resilient flange that is in its unstressed condition inclined from the perpendicular slightly toward the opposite end of the ear, and outwardly lanced lugs on the side edges of each arm with their free edges spaced from the adjacent flange by a distance substantially equal to the thickness of the wall member on which the ear is mounted, and an inwardly formed embossment on one of the arms with its maximum height located between the flange and lugs of said embossed arm to hold the arms from collapsing beyond the width of the narrow slot.

2. A spring type mounting ear rigidly secured in a narrow slotted opening in a thin wall member, the mounting ear comprising a one-piece generally U-shaped strip of sheet metal, the free end of each arm terminating in a resilient flange that is in its unstressed condition inclined from the perpendicular slightly toward the opposite end of the ear, and at least one outwardly lanced lug on each arm with its free edge spaced from the adjacent flange by a distance which is substantially equal to the thickness of the wall member on which the ear is mounted, and an inner embossment on one of the arms disposed in the area between the adjacent flange and lug, whereby when the ear is forced into the narrow opening the arms will bend slightly until the said inner embossment engages the other arm to prevent the arms from collapsing beyond the narrow width of the slot whereby the lugs are deflected back into the arms from which they were lanced, and the flanges are stressed to lie within a single perpendicular plane so that the lugs are no longer confined in the slot and spring outwardly to solidly clamp the ear in the opening.

References Cited in the file of this patent
UNITED STATES PATENTS

| | | |
|---|---|---|
| 1,965,520 | Boden | July 3, 1934 |
| 2,378,684 | Carlstrom | June 19, 1945 |
| 2,391,298 | Davis | Dec. 18, 1945 |
| 2,560,961 | Knohl | July 17, 1951 |
| 2,683,577 | Flora | July 13, 1954 |